United States Patent [19]

Desire et al.

[11] 4,118,462

[45] Oct. 3, 1978

[54] PROCESS FOR THE PREPARATION OF PURIFIED PHOSPHORIC SOLUTIONS FROM PHOSPHORIC ACID

[75] Inventors: Pierre Desire, Les Roches de Condrieu; Jacques Helgorsky, Frepillon, both of France

[73] Assignee: Rhone-Poulenc Industries, Paris, France

[21] Appl. No.: 741,626

[22] Filed: Nov. 15, 1976

Related U.S. Application Data

[63] Continuation of Ser. No. 549,470, Feb. 13, 1975, abandoned.

[30] Foreign Application Priority Data

Feb. 1, 1974 [FR] France .................................. 74 03399

[51] Int. Cl.$^2$ ...................... C01B 25/16; C01B 15/16; C01B 25/26
[52] U.S. Cl. ................................ 423/321 S; 423/309; 423/310; 423/313
[58] Field of Search ....................... 423/305, 307–313, 423/321 S, 321 R

[56] References Cited

U.S. PATENT DOCUMENTS

| 1,857,470 | 5/1932 | Milligan | 423/321 S |
| 3,607,029 | 9/1971 | Goret et al. | 423/321 S |
| 3,767,769 | 10/1973 | Winand et al. | 423/321 S |
| 4,018,869 | 4/1977 | Beltz et al. | 423/321 R |

FOREIGN PATENT DOCUMENTS

1,240,285  7/1971  United Kingdom ................. 423/321 S

*Primary Examiner*—O. R. Vertiz
*Assistant Examiner*—Gregory A. Heller
*Attorney, Agent, or Firm*—McDougall, Hersh & Scott

[57] ABSTRACT

Process for the preparation of a purified solution of phosphoric acid, which may be partially neutralized, from wet process phosphoric acid, by liquid-liquid extraction by means of a substantially water-immiscible organic solvent. The phosphoric acid is treated in the selected solvent, preferably isobutyl alcohol, in the presence of sulphuric acid, by means of an aqueous solution containing phosphate ions and calcium ions in solution, the sulphate ions are precipitated in the form of calcium sulphate, and suspended in said aqueous solution which is separated from the phosphoric solution. The process is advantageously employed for the continuous preparation of concentrated solutions of monosodium phosphate.

15 Claims, 1 Drawing Figure

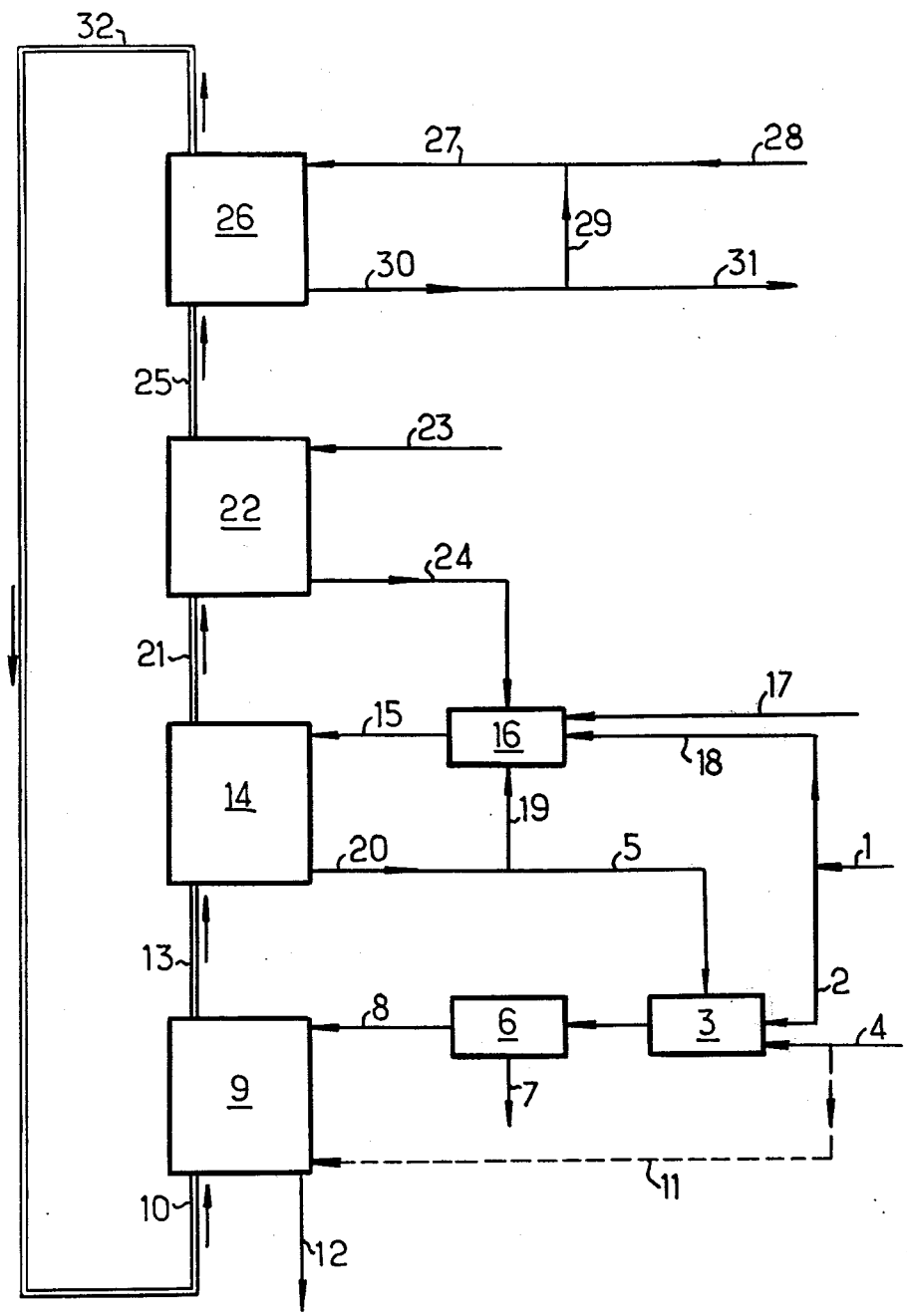

PROCESS FOR THE PREPARATION OF PURIFIED PHOSPHORIC SOLUTIONS FROM PHOSPHORIC ACID

This is a continuation, of application Ser. No. 549,470, filed Feb. 13, 1975, now abandoned.

The present process concerns the preparation of purified solutions of phosphoric acid, which may be partially neutralized, from wet process phosphoric acid, by liquid-liquid extraction by means of an organic solvent, with a high extraction yield.

Processes for extraction by means of organic solvents are known which, when used for wet process phosphoric acid, provide for the extraction of phosphoric acid to the exclusion of its impurities, primarily cationic impurities such as iron, chromium and aluminum compounds. In these processes, the solvents used are generally $C_4$ to $C_8$ alcohols which are charged with water to a greater or lesser extent and which are partly water-miscible. It is known also that the addition of a strong acid, in particular sulphuric acid, to the phosphoric acid, promotes extraction of the phosphoric acid. This thus increases the extraction yield. However, sulphuric acid is at least partially extracted together with the phosphoric acid, and requires removal.

The removal of the introduced sulphate ions is subject to various difficulties.

It has been proposed that the operation of removing the sulphate ions can be carried out by forming insoluble sulphates of alkaline-earth metal salts such as barium sulphate, but this process is expensive. Other alkaline-earth salts have been proposed, particularly tricalcium phosphate whch is partially solubilized, as in U.S. Pat. No. 2,885,265. Carrying out the process described in the above-mentioned patent requires bringing into contact with the solvent, all of the slurry resulting from the sulphuric acid attack on the phosphate-bearing raw material; the residual gypsum is thus removed with most of the impurities in the ore; the organic phase containing the phosphoric and sulphuric acids is then contacted with a second slurry resulting from attack on the ore, by means of a deficiency of sulphuric acid. The reactions in solvent phase, which lead to the formation of calcium sulphate, are neither complete nor rapid under these conditions; nor can the degree of purity achieved be satisfactory. In order to overcome these difficulties, the above-mentioned U.S. patent provides for controlling the attack on the ore with as small an amount of sulphuric acid as possible, thereby resulting, in known manner, in only moderate solubilization of the ore, and an only moderate solvent extraction yield.

The extraction of slurries also suffers from technological difficulties; the combined effect of these deficiencies means that the process set out in the U.S. patent cannot be applied continuously in industrial practice.

Generally, it has not been possible to achieve, at the same time, a high extraction yield and a phosphoric acid in a high degree of purity.

The research, which lead to the making of the present invention, made it possible to provide a re-extraction process which, in a single, rapid and complete operation, removes a substantial excess of sulphuric acid which is added, in the operation of extracting impure phosphoric acid by means of a solvent.

The process, according to the invention, provides for the preparation of very pure phosphoric solutions from impure wet process phosphoric acid. In this process, the impure phosphoric acid is extracted in counter-flow in the presence of sulphuric acid and water, with a very high extraction yield, by means of an organic solvent which is substantially water-immiscible. An aqueous phase, containing the major part of the impurities, and an organic solvent phase are separated, the phosphoric acid being re-extracted from the organic solvent phase. The process comprises the following sequence of steps: in a first step, the impure phosphoric acid is extracted in counterflow in the presence of sulphuric acid and water by means of an organic solvent which is substantially immiscible in water; in a second step, which characterizes the process, the phosphoric acid is treated in the organic solvent in the presence of sulphuric acid, by contact by means of an aqueous solution containing phosphate ions and calcium ions in solution, prepared from calcium phosphate, phosphoric acid and water, in respective amounts such that the content of calcium ions in solution is from 2% to 6% expressed as CaO, so as to precipitate the sulphate ions in the form of calcium sulphate and to put them in suspension in said solution; in a third step, water is used to wash the phosphoric acid in the organic solvent; and, in a fourth step, the organic solvent is separated from a purified phosphoric aqueous solution which constitutes the product of the process.

The phosphoric acid which enters the extraction step advantageously has a sulphuric acid content which is at least equal to 2% and preferably is of the order of 4%.

It is of advantage for the second step to be carried out as a continuous operation within a recycled flow of aqueous solution containing phosphate ions and calcium ions in solution, the flow rate of which is from 0.2 to twice approximately the flow rate of the organic solvent phase. The flow rate of the aqueous solution is preferably so controlled that it is substantially equal to the flow rate of the solvent phase.

It is of advantage for the recycled flow of aqueous solution to contain from 5% to 20% by weight of calcium sulphate in suspension, and, preferably, an amount of the order of 10%.

Use is preferably made of a reaction vessel which provides for continuous operation.

The aqueous solution is preferably prepared by reacting tricalcium phosphate and impure wet process phosphoric acid in the presence of water. Use is advantageously made of a portion which is taken from the impure phosphoric acid introduced into the process. The water used is preferably water which has been employed for the water-washing of the organic solvent extract and which contains a small proportion of phosphoric acid.

In the preparation of the aqueous solution containing phosphate ions and calcium ions in solution essentially in the form of monocalcium phosphate, use is made advantageously of a calcium phosphate ore which has preferably been calcined beforehand.

The relative proportions of the components of the aqueous solution are preferably so controlled as not to modify the composition of the recycled suspension, at the outlet from the contact reaction vessel.

At the outlet of the contact reaction vessel, a part of the recycled flow of aqueous solution which is calcium sulphate-bearing is removed from the aqueous solution which is recycled with phosphoric acid in the solvent, and the remainder of the solution to which the monocalcium phosphate solution is added, in an amount equivalent to the removed portion of aqueous solution containing the calcium ions in solution is recycled in a continuous flow.

The removed portion of aqueous suspension is contacted with a part at least of the impure phosphoric acid which enters into the process, and with sulphuric acid, in a suitable device comprising a mixing section and a decantation section. There is thus formed a supplementary amount of calcium sulphate which is removed at the same time as the previously formed calcium sulphate, and the phosphoric acid, which is virtually free from calcium sulphate, is introduced into the extraction reaction vessel, in the presence of excess sulphuric acid.

The amount of sulphuric acid added is calculated so as to have the desired content of $SO_4 -$ ions, in phosphoric acid, at the inlet of the extraction reaction vessel.

A supplementary amount of sulphuric acid can possibly be added at any point whatever of the extraction apparatus, as is known in particular from French Pat. No. 1,531,487.

The selected organic solvent is introduced at the same time. Advantageously, this solvent is generally collected after the last step and is possibly subjected to purification treatments by methods known per se, before being recycled for use in the extraction step.

The organic solvent which is substantially immiscible in water is generally an aliphatic alcohol containing from 4 to 8 carbon atoms. It is of advantage for isobutyl alcohol to be used.

After the water washing step, an organic extract containing phosphoric acid from which the $SO_4 -$ ions have been removed, is collected.

In an advantageous embodiment, this organic extract is treated with water, and an aqueous solution of phosphoric acid which constitutes the product of the process, is collected.

In a preferred embodiment, the organic extract is treated with a neutralizing compound, such as a compound of an alkali metal such as sodium or potassium, or an ammoniacal compound, and a concentrated aqueous solution of alkali phosphate, which forms the product of the process, is collected.

The neutralization operation is advantageously performed by introducing the neutralizing compound into a recycled flow of concentrated partially neutralized aqueous solution of phosphoric acid, in accordance with the process already described in the applicants' French patent application No. 1,553,095.

This recycled flow is divided after the outlet from the neutralization reaction vessel, and a portion thereof is recycled, a controlled amount of neutralizing compound being added to the recycled portion. The remaining portion of recycled flow of partially neutralized, concentrated and purified phosphoric acid, which forms the product of the process, is then collected.

It is noted that extraction by means of the organic solvent is performed with an extraction efficiency of the order of approximately from 95% to 98%, and most generally of the order of 96%.

It is also found that using the solution containing phosphate ions and calcium ions in solution, in accordance with the mode of operation described hereinbefore, provides for virtually complete removal of the excess of sulphuric acid contained in the phosphoric organic extract, this being effected in a single reaction vessel.

This solution is prepared rapidly; it is noted in fact that under the above-described conditions, the ore is rendered soluble virtually instantaneously. In this way, there is produced a solution which contains a large amount of calcium ions in solution; moreover, and this is of advantage, this amount is kept virtually constant.

Regulating the amount of gypsum in suspension permits easy handling of the recycled solution, with a high flow rate. In this way, the reaction medium in the contact reaction vessel is homogeneous and the multiple contacts between the phases promote the speed of the reaction.

In the event that phosphoric acid is produced in the form of relatively concentrated solutions, a high degree of purity is achieved, coupled with a very high extraction yield.

In the event that the phosphoric organic extract is treated in the neutralization step, in accordance with the advantageous mode of continuously introducing neutralizing compound, as described hereinbefore, the same advantages are achieved, and moreover, the phosphates are collected in a highly concentrated form which is economically very attractive.

Thus, monosodium phosphate is readily obtained in the form of a 40% concentrated solution, or even better, which reduces the cost of subsequent drying operations.

By virtue of their degree of purity, the products obtained in performing the process of the present invention can be used directly, in particular in the detergent industry, or in the foodstuffs industry.

Moreover, the process of the invention, which makes it possible to remove metal impurities such as iron, chromium and aluminum, originating from the raw material, as well as the excess $SO_4 -$ ions, can easily be integrated into a process comprising other operations intended to remove other impurities which may be present.

FIG. 1 shows the diagram of an installation for continuously carrying out the process of the invention.

Reference numeral 1 represents the flow of the phosphoric acid in a wet state to be treated, a portion 2 of which acid enters a reaction vessel 3 which receives, at 4, sulphuric acid and at 5 an aqueous suspension resulting from the subsequent desulphatation step. The products from the reaction in the reaction vessel 3 are passed into a filtration zone 6 in which the insoluble products are separated at 7, while the liquid is passed by way of conduit 8 into an extraction contacting vessel 9 into which a solvent, which may possibly be mixed with water, is also introduced, at 10. There is the possibility of introducing at any stage whatever of the contacting vessel 9, a portion of sulphuric acid from 4, which is shown at 11. The residual aqueous phase is discharged by way of the outlet 12.

At the outlet 13 of the extraction contacting vessel, there is collected an organic phosphoric acid extract which is passed into a desulphatation contacting vessel 14 which also receives, at 15, an aqueous solution of calcium ions, which was prepared in the reaction vessel 16. This solution is prepared by means of an amount of tricalcium phosphate introduced at 17 and contacted with a portion 18 of the wet process phosphoric acid introduced into the process. The flow of the aqueous solution of calcium ions is combined with a flow 19 of calcium suspension, which is drawn from the product issuing at 20 from the contacting vessel 14.

At the outlet 22 of the contacting vessel 14, there is collected an organic extract which is passed into the washing contacting vessel 22, where washing is effected by means of water introduced at 23, and which issues from the vessel 22 at 24 in the form of an aqueous solution, while the organic extract, after washing, is introduced at 25 into contacting vessel 26. A neutralizing compound 28 is introduced at 27 into the contacting vessel 26, by means of a flow of partially neutralized phosphoric acid, which is drawn off at 29 from the outlet flow 30 of the contacting vessel 26. The partially neutralized phosphoric acid which constitutes the product of the process is collected at 31.

Reference numeral 32 denotes recovery of the solvent which is recycled at 10, after purification and possibly dehydration treatments, by conventional means (not shown).

The following examples are given by way of illustration, without limitation, of the various embodiments of the process of the invention.

EXAMPLE 1

In this example, a solution with a high calcium content is prepared by a reaction between some ore and a weak phosphoric solution comprising the solvent washing water. The product of the reaction, in which all the calcium of the ore introduced is rendered soluble, is mixed with a recycled portion of the product of the desulphatation operation, containing calcium sulphate, and the resulting suspension is introduced into the desulphatation reaction vessel.

In an installation as shown diagrammatically in the accompanying drawing, impure wet process phosphoric acid, containing by weight $P_2O_5$ 25%, CaO 0.25%, and $SO_4$ 1.5%, F 0.2%, MgO 0.2%, $Fe_2O_3$ + $Al_2O_3$ = 0.3%, is introduced at a rate of 1 t/h into the reaction vessel shown at 3.

Also added into the reaction vessel is 40 kg/h of sulphuric acid, and also the slurry resulting from the desulphatation operation in the reaction vessel 16.

The insoluble compounds are filtered off, and a solution is produced whose weight composition is $P_2O_5$ 25%, $SO_4$ — total 3%, of which 2% is in the form of free sulphuric acid. This solution is introduced at the first stage of a multi-stage contacting vessel comprising 5 theoretical stages, at the fifth stage of which there is introduced a mixture of 92 weight % of isobutanol and 8 weight % water; in a flow rate of 8 200 kg/h, and 30 kg/h of sulphuric acid, by way of the conduit 11.

At the outlet of the fifth stage, there is an aqueous effluent in a flow rate of 316 kg/h. which contains 4% of unextracted phosphoric acid, and total $SO_4$ — 15%, of which 10% is free sulphuric acid.

At the outlet 13 of the first stage, there is an organic extract which is passed into a desulphatation contacting vessel comprising one theoretical stage, at the same time as a flow of a suspensiom prepared, as described hereinafter, in the reaction vessel 16.

A flow rate of 35 kg/h of phosphate-bearing ore whose composition by weight is $P_2O_5$ 35%, and CaO 50% is passed into the reaction vessel 16, at the same time as 147 kg of an aqueous solution of dilute phosphoric acid resulting from the washing treatment with water in the contacting vessel 22, together with a suspension which is introduced at 19 and whose weight composition is $P_2O_5$ 21%, insoluble $CaSO_4$ 14%, and CaO in soluble form 2%. The products of the reaction pass into the desulphatation reaction vessel at the inlet denoted at 15.

The suspension issuing from the contacting vessel 14 is divided into two flows, one being recycled and feeding the reaction vessel 16, and the other being used to feed the reaction vessel 3.

The organic extract issuing from the reaction vessel 14, by way of the conduit 21, is introduced at the first stage of a washing contacting vessel comprising two theoretical stages, into which washing water is introduced at a flow rate of 230 kg/h. The aqueous solution issuing from the vessel is used to feed the above-described reaction vessel 16, while the purified organic extract is passed to the regeneration contacting vessel comprising one theoretical stage, as indicated at 26.

Also introduced into this contacting vessel are an aqueous solution of approximately 40% by weight of monosodium phosphate, at a flow rate of 8 t/h, and sodium carbonate at a flow rate of 200 kg/h.

At the outlet from this contacting vessel there is collected an approximately 40% monosodium phosphate aqueous solution, a part of which is recycled at a flow rate of 8 t/h while the remainder, whose flow rate is 1,100 kg/h, is collected and forms the product of the process.

The product contains 96% of the total $P_2O_5$ passing into the installation. Its composition, related to the $P_2O_5$, is as follows:

$SO_4$: 0.2%/$P_2O_5$
F: 0.5
CaO: 0.01
MgO: 0.01
$Fe_2O_3$: 0.01
$Al_2O_3$: 0.002

In this example, 50% of the sulphuric acid, added to promote the phosphoric acid extraction, was used for the preparation of a supplementary amount of phosphoric acid which is purified in this process.

EXAMPLE 2

In this example, the solution with a high calcium content is formed by the reaction between the ore and the entire amount of phosphoric acid, in a wet state, which is involved in the process.

The flow rate of the liquid at 2 is then zero. The flow rate in the conduit 1 is equal to that in the conduit 18, namely 1 ton per hour, of the same impure wet process phosphoric acid, as in the preceding example.

The liquid, which passes by way of the conduit 4, comprises $H_2SO_4$, at a flow rate of 97 kg/h. The liquid in the conduit 8 is a solution titrating $P_2O_5$ 22%, soluble CaO 0.02%, free $H_4SO_4$ 4%, at a flow rate of 1,100 kg/h. The contacting vessel 9 comprises 12 theoretical stages.

Isobutanol with 8.3% water is introduced at 10, at a flow rate of 8 t/h.

The flow at 11 is zero.

280 kg/h of a solution titrating $P_2O_5$ 4% and $H_2SO_4$ 0.5% and containing all the metal impurities of the initial impure acid, is removed at 12.

The contacting vessel 14 comprises one theoretical stage. 1,080 kg/h of a slurry titrating $P_2O_5$ 26%, CaO 3% and $CaSO_4$ 2% is introduced at 15. Ore titrating $P_2O_5$ 35% and CaO 50% is introduced at 17, at a flow rate of 80 kg/h. The flow rate at 20 is equal to the flow rate at 5, that is to say, 1,100 kg/h of slurry titrating $P_2O_5$ 21%, insoluble gypsum 8% and soluble CaO 1%. The contacting vessel 22 comprises one theoretical stage. 210 kg/h of water is introduced at 23. A washing solution is introduced at 24 at a flow rate of 95 kg, the washing solution titrating $P_2O_5$ 15% and containing the metal impurities which had been extracted with the phosphoric acid.

Finally, a solution of monosodium phosphate, with approximately 40% of monosodium phosphate, containing 96% of the impure phosphoric acid which entered into the process, and in a state of purity equivalent to that of the product obtained in Example 1, except for the amount of sulphate which, expressed as $P_2O_5$, titrates 0.5%, is collected at 31.

In this example, 98% of the sulphuric acid used serves to prepare a supplementary amount of phosphoric acid which is purified in the process.

EXAMPLE 3

In this example, only a part of the impure phosphoric acid going into the process is used to prepare the calcium-rich solution which is then more highly concentrated in soluble calcium, then the solution in the preceding example.

Only the values which are changed in comparison with the preceding example are indicated hereinafter.

A solution of impure wet process phosphoric acid, titrating $P_2O_5$ 25%, CaO 0.25%, $SO_4$ 1.5%, F 0.2%, MgO 0.2%, $Fe_2O_3$ + $Al_2O_3$ 0.3%, is introduced at 1 in the accompanying drawing at a flow rate of 1 t/h. This acid is divided into two parts, one part of 360 kg/h being taken by way of 2 and the other of 640 kg/h being taken by way of 18.

A suspension titrating $P_2O_5$ 25%, soluble CaO 3.5% and insoluble gypsum 5% is introduced at 15 at a flow rate of 1,500 kg/h.

A suspension titrating $P_2O_5$ 25%, soluble CaO 2% and insoluble gypsum 8.5% is introduced at 19 at a flow rate of 800 kg/h, while a flow rate of 750 kg/h of the same suspension is introduced at 5.

Sulphuric acid at a flow rate of 112 kg/h is introduced at 4.

The yield in respect of phosphoric acid recovered in the form of an approximately 40% monosodium phosphate solution is 96%. The state of purity of this monosodium phosphate is the same as that of the preceding examples, except for the amount of sulphate which, expressed as $P_2O_5$, has decreased from 0.2% to 0.1%.

98% of the sulphuric acid used in the process provides for the preparation of purified acid which is produced in the form of monosodium phosphate.

EXAMPLE 4

In this example, the purified phosphoric solution is prepared in the form of a phosphoric acid solution, instead of a monosodium phosphate solution.

At the outlet of the washing contacting vessel 22, under the conditions of Example 1, there is recovered an organic extract 25 at a flow rate of 8.4 t/h. The organic extract contains by weight $P_2O_5$ 3%, $H_2O$ 15% and $H_2SO_4$ 0.015%, and is passed to the first stage of the multi-stage contacting vessel 26 which comprises eight theoretical stages.

Water is passed into the eighth stage of the contacting vessel by way of the conduit 27, at a flow rate of 1.4 t/h.

An aqueous solution of purified phosphoric acid containing 96% of the acid introduced and titrating 16% of $P_2O_5$ is collected at the first stage of the contacting vessel 26.

The degree of purity is equivalent to that obtained in Example 1.

The solvent 32 is dehydrated by known means, before being introduced into the contacting vessel 9 at 10.

We claim:

1. A process for the preparation of pure phosphoric acid solutions from impure wet process phosphoric acid with a recovery of at least 95% of the phosphoric acid containing a small amount of sulphuric acid comprising the steps of subjecting the impure phosphoric acid containing water and sulphuric acid to liquid-liquid contact with a substantially water immiscible aliphatic $C_4$–$C_8$ alcohol which extracts most of the phosphoric acid and some of the sulphuric acid and separates from the aqueous phase as a solvent phase, separating the organic solvent phase from the aqueous phase, subjecting the separated organic solvent phase to liquid-liquid contact with an aqueous solution containing phosphate ions and calcium ions to precipitate out $SO_4^=$ as calcium sulphate, subjecting the organic solvent phase which still contains the phosphoric acid in solution to liquid-liquid contact with an aqueous phase whereby the purified phosphoric acid transfers from the organic solvent phase to the aqueous phase, and separating the aqueous phase containing the purified phosphoric acid from the organic solvent phase.

2. The process as claimed in claim 1 in which the calcium ion is present in the aqueous solution subjected to liquid-liquid contact with the separated organic phase in an amount within the range of 2–6%, expressed as CaO.

3. A process according to claim 1 in which the aqueous solution containing phosphate ions and calcium ions in solution is prepared by reaction of calcium phosphate, phosphoric acid and water.

4. A process according to claim 1, characterized in that the sulphuric acid content of the phosphoric acid solution subjected to extraction with the organic solvent is at least equal to 2%.

5. A process according to claim 1, characterized in that the sulphuric acid content of the phosphoric acid solution subjected to extraction with the organic solvent is of the order of 4% by weight.

6. A process according to claim 1, in which the liquid-liquid contact of the organic solvent extract with the aqueous solution containing phosphate and calcium ion is carried out in continuous recycled flow, the flow rate of which is approximately from 0.2 to twice the flow rate of the organic solvent phase.

7. A process according to claim 6, characterized in that the recycled flow of aqueous solution has a flow rate which is substantially equal to the flow rate of the organic solvent phase.

8. A process according to claim 7, characterized in that the recycled flow of aqueous solution contains from 5% to 20% by weight of calcium sulphate in suspension.

9. A process according to claim 1, characterized in that a part of the aqueous solution bearing calcium sulphate, is taken off at the outlet from the contact reaction vessel from the aqueous solution with the phosphoric acid in the organic solvent in the presence of sulphuric acid, and is removed from the system while the remainder of the solution is recycled, there being added thereto an amount, equivalent to the part removed, of aqueous solution containing phosphate ions and calcium ions in solution.

10. A process according to claim 9, characterized in that the removed part of aqueous suspension containing calcium sulphate is contacted with a part at least of the impure phosphoric acid which enters into the process, in the presence of sulphuric acid, thereby providing a supplementary amount of calcium sulphate, said supplementary amount being removed at the same time as the previously formed calcium sulphate is introduced into the extraction reaction vessel, in the presence of excess sulphuric acid.

11. A process according to claim 10, characterized in that a supplementary amount of sulphuric acid is added at any point whatever of the extraction process.

12. A process according to claim 1, characterized in that the aliphatic alcohol is isobutyl alcohol.

13. A process according to claim 1, which includes the step of treating the organic solvent phase containing phosphoric acid with a neutralizing compound.

14. A process according to claim 13 in which the neutralizing compound is selected from the group consisting of sodium, potassium and ammonium compound.

15. A process according to claim 13, characterized in that the neutralizing compound is introduced into a recycled flow of partially neutralized alkali phosphate solution.

* * * * *